US011949785B1

(12) United States Patent
Griffin

(10) Patent No.: US 11,949,785 B1
(45) Date of Patent: *Apr. 2, 2024

(54) BIOMETRIC AUTHENTICATED BIOMETRIC ENROLLMENT

(71) Applicant: Wells Fargo Bank, N.A., San Francisco, CA (US)

(72) Inventor: Phillip H. Griffin, Raleigh, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,352

(22) Filed: Jan. 30, 2023

Related U.S. Application Data

(63) Continuation of application No. 17/484,116, filed on Sep. 24, 2021, now Pat. No. 11,569,991, which is a continuation of application No. 16/124,485, filed on Sep. 7, 2018, now Pat. No. 11,139,964.

(51) Int. Cl.
*H04L 9/32* (2006.01)
*H04L 9/08* (2006.01)

(52) U.S. Cl.
CPC .......... *H04L 9/0866* (2013.01); *H04L 9/0844* (2013.01); *H04L 9/0894* (2013.01); *H04L 9/3231* (2013.01)

(58) Field of Classification Search
CPC ... H04L 9/0866; H04L 9/0844; H04L 9/0894; H04L 9/3231
See application file for complete search history.

(56) References Cited

U.S. PATENT DOCUMENTS

| 2009/0052745 | A2* | 2/2009 | Sathath | G06F 21/31 902/3 |
| 2009/0235086 | A1* | 9/2009 | Lai | G06F 21/32 713/186 |
| 2010/0205431 | A1* | 8/2010 | Griffin | G06F 21/32 713/158 |
| 2011/0082791 | A1* | 4/2011 | Baghdasaryan | G06Q 20/40145 705/44 |
| 2016/0171199 | A1* | 6/2016 | Beatson | H04L 9/3231 713/186 |
| 2017/0070497 | A1* | 3/2017 | McCallum | H04L 9/3231 |
| 2018/0191501 | A1* | 7/2018 | Lindemann | H04L 9/0833 |
| 2019/0394192 | A1 | 12/2019 | Kale et al. | |

\* cited by examiner

*Primary Examiner* — Amie C. Lin
(74) *Attorney, Agent, or Firm* — Foley & Lardner LLP

(57) ABSTRACT

An example method includes receiving an encrypted biometric enrollment data and user identifier data. The encrypted biometric enrollment data includes at least one biometric enrollment sample from a user encrypted using an encryption key. The encryption key is generated based on a user secret and the user identifier is associated with the user. The user identifier is matched with a stored user secret. A decryption key is generated based on the stored user secret. The encrypted biometric enrollment data is decrypted using the decryption key. The at least one biometric enrollment sample is retrieved from the decrypted biometric enrollment data. The at least one biometric enrollment sample is processed using a biometric processing algorithm to generate a biometric reference template. A biometric reference template identifier uniquely identifying the biometric reference template is generated. An encryption key is generated based on the stored user secret and encrypts an enrollment confirmation message.

20 Claims, 4 Drawing Sheets

400

```
BABESchema {
joint-iso-itu-t(2) country(16) us(840) organization(1) wfbna(114171)
labs(4) eisArchitecture(1) module(0) babeSchema(5)
}

DEFINITIONS AUTOMATIC TAGS ::= BEGIN

-- EXPORTS All --

-- IMPORTS None; --

-- XML namepace: urn:oid:2.16.840.1.114171.4.1.2.5 --

MultifactorAuthentication ::= SEQUENCE {
    possessions  Possessions OPTIONAL,
    biometrics   Biometrics OPTIONAL,
    knowledge    UserKnowledge OPTIONAL
}

Possessions ::= SEQUENCE SIZE(1..MAX) OF Possession

Possession ::= FactorType {{PossessionSet}}

PossessionSet FACTOR ::= {
    { OID paymentCard  PARMS Card } |
    { OID secureToken  PARMS Token } |
    { OID taggedObject PARMS Identifier },
    ... -- Expect additional possession factor objects --
}

Card ::= OCTET STRING(SIZE(1..MAX)) -- Magnetic stripe data

Token ::= OCTET STRING(SIZE(1..MAX))

Identifier ::= OCTET STRING(SIZE(1..MAX)) -- RFID or transponder

Biometrics ::= SEQUENCE SIZE(1..MAX) OF Biometric

Biometric ::= SEQUENCE {
    biometric  FactorType {{BiometricSet}},
    bsp-URI    URI OPTIONAL
}

URI ::= UTF8String(SIZE(1..MAX))

BiometricSet FACTOR ::= {
    { OID fingerprint  PARMS Fingerprint } |
    { OID handGeometry PARMS HandGeometry } |
    { OID voiceprint   PARMS Voiceprint },
    ... -- Expect additional biometric factor objects --
}

Fingerprint ::= OCTET STRING(SIZE(1..MAX))

HandGeometry ::= OCTET STRING(SIZE(1..MAX))

Voiceprint ::= OCTET STRING(SIZE(1..MAX))

UserKnowledge ::= SEQUENCE SIZE(1..MAX) OF Knowledge

Knowledge ::= FactorType {{KnowledgeSet}}

KnowledgeSet FACTOR ::= {
    { OID password  PARMS Password } |
    { OID challenge PARMS Challenge } |
    { OID accountNo PARMS AccountNo },
    ... -- Expect additional knowledge factor objects --
}

Password ::= UTF8String(SIZE(8..MAX))

Challenge ::= OCTET STRING(SIZE(1..MAX))

AccountNo ::= UTF8String(SIZE(6..MAX))

EnrollBiometrics ::= SEQUENCE {

}

-- Useful definitions --

FactorType { FACTOR:IOSet } ::= SEQUENCE {
    type  FACTOR.&id({IOSet}),
    value FACTOR.&Type({IOSet}{@type}) OPTIONAL
}

FACTOR ::= CLASS {
    &id    OBJECT IDENTIFIER UNIQUE,
    &Type  OPTIONAL
}
WITH SYNTAX { OID &id [ PARMS &Type ] }

OID ::= OBJECT IDENTIFIER -- Alias factor OID ::= {
joint-iso-itu-t(2) country(16) us(840) organization(1) wfbna(114171)
labs(4) eisArchitecture(1) module(0) babe(5) factor(1)
} had  OID ::= { factor possessed(0) }
was  OID ::= { factor humankind(1) }
knew OID ::= { factor something(2) } paymentCard   OID ::= { had card(0) }
secureToken   OID ::= { had sfob(1) }
taggedObject  OID ::= { had rfid(2) } fingerprint   OID ::= { was digit(0) }
handGeometry  OID ::= { was shape(1) }
voiceprint    OID ::= { was voice(2) } password   OID ::= { knew phrase(0) }
challenge  OID ::= { knew answer(1) }
accountNo  OID ::= { knew account(2) }

END -- BABESchema --
```

FIG. 4

BIOMETRIC AUTHENTICATED BIOMETRIC ENROLLMENT

CROSS-REFERENCE TO RELATED APPLICATION

This application is a continuation of U.S. patent application Ser. No. 17/484,116, filed Sep. 24, 2021, entitled "BIOMETRIC AUTHENTICATED BIOMETRIC ENROLLMENT," which itself is a continuation of U.S. Pat. No. 11,139,964, filed Sep. 7, 2018, entitled "BIOMETRIC AUTHENTICATED BIOMETRIC ENROLLMENT," all of which are hereby incorporated by reference in their entireties and for all purposes.

BACKGROUND

Access control systems may use one or more authentication factors to verify an individual's identity. For example, authentication factors may include "something-you-know," "something-you-have," and "something-you-are." Some access control systems may require elements from two or three of these categories to provide two or three-factor authentication.

Biometrics may provide the "something-you-are" factor used for identification and authentication. Biometrics can be coupled with other categories of factors, such as "something-you-have," and "something-you-know," to achieve two and three-factor authentication when greater assurance is required than a single factor can provide. Biometric traits may include, for example, biological (e.g., fingerprint, iris, hand geometry, etc.) and behavioral (e.g., gait, gesture, keystroke dynamics, etc.) characteristics that reliably distinguish one person from another.

Biometric technology is used to confirm the identity of an individual in order to provide secure access to electronic systems (e.g., to perform financial transactions). After an individual enrolls in a biometric service (e.g., provides biometric data and a non-biometric means of confirming an identity), the individual can be authenticated via the biometric service. Biometric authentication (e.g., identification and verification) leverages the universally recognized fact that certain physiological or behavioral characteristics can reliably distinguish one person from another. Biometric technology includes both automatically collecting and comparing these characteristics. Digital representations of these characteristics are stored in an electronic medium and later used to authenticate the identity of an individual.

SUMMARY

Various embodiments relate to a method performed by a processor of a computing system. An example method includes receiving an encrypted biometric enrollment data and a user identifier data. The encrypted biometric enrollment data includes at least one biometric enrollment sample from a user encrypted using an encryption key. The encryption key is generated based on a user secret and the user identifier is associated with the user. The user identifier is matched with a stored user secret. A decryption key is generated based on the stored user secret. The encrypted biometric enrollment data is decrypted using the decryption key. The at least one biometric enrollment sample is retrieved from the decrypted biometric enrollment data. The at least one biometric enrollment sample is processed using a biometric processing algorithm to generate a biometric reference template. A biometric reference template identifier uniquely identifying the biometric reference template is generated. An encryption key is generated based on the stored user secret. An enrollment confirmation message is encrypted using the encryption key. The enrollment confirmation message including the biometric reference template identifier.

Various other embodiments relate to a method performed by a processor of a computing system. An example method includes receiving a user identifier and encrypted authentication data from a relying party. The encrypted authentication data includes a biometric authentication sample and a biometric reference template identifier encrypted using an encryption key. The encryption key is generated based on a user secret. The user identifier is matched with a stored user secret. A decryption key is generated based on the stored user secret. the encrypted authentication data is decrypted using the decryption key. The biometric authentication sample is retrieved from the decrypted authentication data. The biometric authentication sample is authenticated by comparing the biometric authentication sample to a biometric reference template associated with the biometric reference template identifier.

Various other embodiments relate to a computing system. An example computing system includes a network interface in operative communication with a network. The system also includes a database of a plurality of user identifiers and associated stored user secrets. The system further includes a server system, including a processor and instructions stored in a non-transitory machine-readable media. The instructions are configured to cause the server system to receive an encrypted biometric enrollment data and a user identifier data. The encrypted biometric enrollment data includes at least one biometric enrollment sample from a user encrypted using an encryption key. The encryption key is generated based on a user secret and the user identifier is associated with the user. The user identifier is matched with a stored user secret. A decryption key is generated based on the stored user secret. The encrypted biometric enrollment data is decrypted using the decryption key. The at least one biometric enrollment sample is retrieved from the decrypted biometric enrollment data. The at least one biometric enrollment sample is processed using a biometric processing algorithm to generate a biometric reference template. A biometric reference template identifier uniquely identifying the biometric reference template is generated. An encryption key is generated based on the stored user secret. An enrollment confirmation message is encrypted using the encryption key. The enrollment confirmation message including the biometric reference template identifier.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 4 is a schema for the BABE processing system, according to an example embodiment.

DETAILED DESCRIPTION

Figure 1:
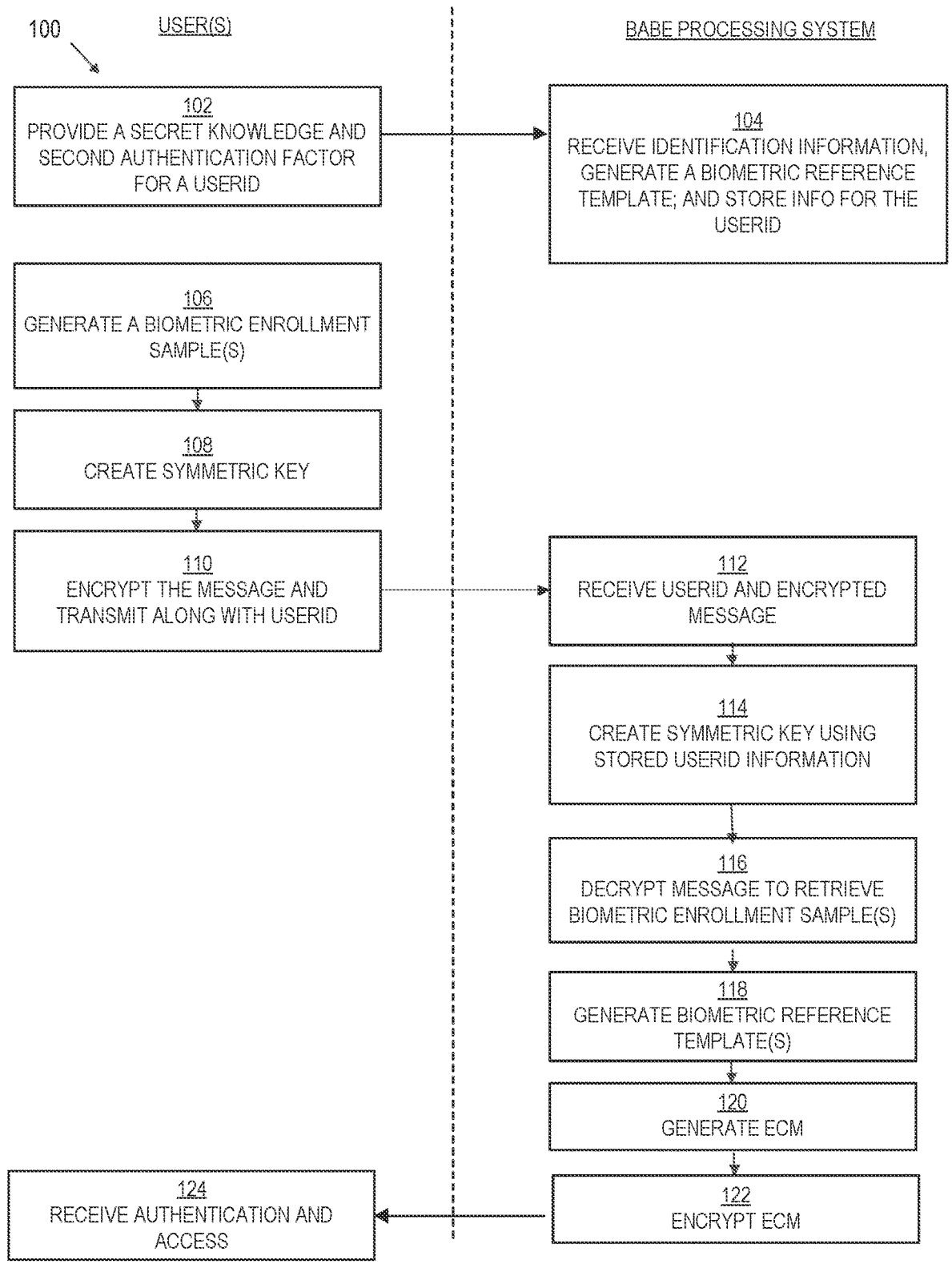
FIG. 1 is a flow diagram of a method of enrolling at least one biometric enrollment sample of a user with a biometric authenticated biometric enrollment ("BABE") processing system, according to an example embodiment.

Biometrics can be used for human identification and authentication for both physical and logical access (e.g., access to applications, services, or entitlements, etc.). Sensor-collected data can contain human knowledge, which may provide the something-you-know information used for authentication. Knowledge extraction techniques applied to this data can reveal weak secrets expressed by an individual. These secrets are termed weak because they are something a person can easily memorize, such as a passphrase, a password, or a personal identification number ("PIN"). Biometric-based weak secrets may extend these traditional secrets to also include a sequence of footsteps or the finger positions and hand postures used in a gesture (e.g., during communication of hand sign languages).

A password is a something-you-know authenticator, which may include a string of characters that have an equivalent representation shared by communicating parties. This equivalency makes passwords useful as weak secrets in cryptographic key-agreement schemes, which require both parties to know exactly the same secret in order to establish a shared key to ensure secure communications. Though knowledge extracted from biometric sensors can have this useful equivalency attribute of passwords, often it does not.

Server authentication mechanisms, such as the widely deployed Transport Layer Security ("TLS") protocol, rely on strong asymmetric cryptography supported by a resource intensive Public Key Infrastructure ("PKI"). However, achieving mutual authentication using TLS is not so common. It is more likely for client authentication to rely on user passwords, since most users lack the personal digital certificates needed to leverage the mutual authentication option of TLS.

Passwords and other shareable knowledge-based authentication values are typically used for client-side authentication only, with TLS serving to authenticate the server and protect client passwords in transit. Failures in TLS server authentication and user errors have led to widespread phishing by attackers impersonating legitimate servers to capture user credentials. Consequently, there is a need to provide a strong cryptographic protocol that overcomes the shortcomings of TLS.

Authentication systems require that the party who wishes to be authenticated has enrolled a biometric reference template with a biometric service provider ("BSP") or similar entity. A biometric reference template is a digital reference of distinct characteristics of an individual obtained by processing one or more biometric samples from the individual. Subsequent to enrollment, biometric reference templates are used during biometric authentication processes. Biometric authentication processes include verification and/or identification. Identification is the process of comparing a submitted biometric sample against some or all enrolled biometric reference templates to determine an individual's identity. Identification is a "one-to-many" comparison that entails comparing a match template generated from a newly captured sample to all of the templates in the database. Identification is most often used to determine whether or not an individual has previously enrolled in the system. Verification is the process of comparing a match template against a specific reference template based on a claimed identity (e.g., user ID, account number, etc.). Verification is a "one-to-one" comparison that entails comparing a match template generated from a newly captured sample to a previously generated reference template stored in a database or on an ID card.

Current security techniques for protecting biometric data confidentiality in biometric reference templates have utilized encryption for securely transferring biometrics. Protection by encryption may be performed by a BSP that manages a store of biometric templates. Issues arise when an attacker, including an insider attacker, gains access to the BSP's store of biometric reference templates, and therefore an individual user's biometric data. To protect the confidentiality of personally identifiable biometric data, symmetric key encryption is currently the preferred method of encrypting biometric data (e.g., as set forth in ISO 19092 and X9.84 biometric information security and management standards for financial services).

Various embodiments herein relate to systems and methods for biometric authentication portability through the use of a biometric authentication biometric enrollment ("BABE") processing system. Specifically, a BABE processing system that is used to perform "trusted" authentication for a biometric enrollment of a user or authentication of one or more characteristics of a user (e.g., DOB, financial institution account information, address, etc.). The BABE processing system facilitates the generation and management of one or more confidential Enrollment Confirmation Message ("ECM") for one or more users. Generally, an ECM is generated when a user who successfully enrolls in a biometric system. The ECM contains one or more unique biometric reference template identifiers coupled to a Uniform Resource Identifier ("URI") of the BSP who can match the user's biometric samples of a given biometric type during subsequent user authentication attempts. For example, the BABE processing system may generate a single URI that corresponds to an internal server that includes each biometric service provider associated with each captured biometric. In some embodiments, the ECM contains one or more unique biometric reference template identifiers, with each identifier coupled to a URI of the BSP who can match the user's biometric samples of a given biometric type during subsequent sample user authentication attempts. For example, a user may enroll three separate biometrics (e.g., face, fingerprint, and voice) with the BABE processing system, which in turn sends each biometric to a separate, specialized vendor, generating and coupling three separate identifiers with each biometric sample.

The identifier in the ECM, which is coupled to the URI of the BSP, are now associated with the verified identity of the user. Subsequently, the user can now authenticate their vetted identity by providing a biometric along with the identifier and URI of the BSP (both in the ECM) that can match that the provided sample. As will be appreciated, the BABE processing system allows the user to enroll their biometric once and be authenticated with any third party (e.g., a financial institution, merchant, government agency, etc.) that trusts the BSP to perform biometric matching of the vetted user identity. The BABE processing system allows the user to subsequently enroll a new biometric with a third party or the BABE processing system. Additionally, the BABE processing system provides for authentication of the user, such that the authentication can be used to provide a biometric verification, additional characteristics of the user associated with the ECM, or similar authentication processes.

Expanding generally on initial enrollment, a BSP captures one or more biometric data samples (e.g., fingerprint, voiceprint, iris image, hand geometry, keystroke patterns, dynamic signatures) (typically two or more samples) from a user via a biometric sensor. The BSP is tasked with verifying and vetting the user's identity during initial enrollment. In some instances, this includes vetting the user identity against collateral material such as photo identification, government-issued identification, birth certificates, and the like. Once the identity is verified, an ECM is generated that contains one biometric reference template identifier for each enrolled biometric. Additionally, biometric reference template identifier is coupled to a URI of the BSP that captured the biometric. In some arrangements, the generation of the ECM and/or the generation of each biometric reference template identifier are logged as part of an event log in an audit journal.

Expanding generally on the use of the ECM for subsequent biometric authentication (e.g., biometric authentication portability) and enrollment, as a user may provide a new biometric and a biometric associated with a biometric reference template identifier in the user's ECM to enroll the new biometric as part of their ECM profile. The BABE processing system will authenticate the user and generate, associate, and securely transmit an updated ECM and/or biometric reference template identifier coupled to a URI for storage in the user's ECM. Alternatively, an unknown user (e.g., challenger) provides a claimed identity through the ECM and a fresh biometric sample to a third party. The information in the ECM (e.g., biometric reference template identifier and URI) is used to locate the user profile containing the biometric authentication information in the BABE processing system associated with the claimed identity. As will be appreciated, no biometric information is stored in the ECM, just identifiers, thereby providing security and portability to the biometric information of the user. In some arrangements, the biometric reference template identifier is retrieved and authenticated by the BABE processing system and an authentication result is transmitted to the third party. If the authentication is satisfactory, the third party may use the third party's processing methods to generate a biometric reference template and complete and enrollment process. Alternatively, if the authentication is satisfactory, the third party may use the captured (e.g. new) biometric to initiate a biometrics-based electronic signature on a record (e.g., a contract, mortgage, business transaction, etc.). In other arrangements, the biometric reference template identifier is retrieved and authenticated by the BABE processing system and an authentication result with associated user characteristics or information are returned to the third party.

The BABE processing system protects the user from man-in-the-middle and phishing attacks during user authentication attempts. Following successful user authentication, the described BABE processing system protocol uses authenticated key exchange (-AKE) to establish a secure channel for subsequent communications. This includes a response to the user challenge message needed to achieve mutual authentication, user biometric enrollment attempt status, and useful enrollment tokens that can be used for subsequent biometric matching. The BABE processing system allows an organization to comply with the organization's identity authentication enrollment requirements policy. For example, a policy that includes the use of strong, two-factor user identity authentication along with mutual authentication between the user (e.g., client) and a BABE processing system (e.g., server). User credentials are never transferred in the clear and no digital certificates or PKI are required.

The BABE processing system provides technical solutions to computer-centric and internet-centric problems associated with conventional biometrics and authentication systems. For example, the BABE processing system, according to various embodiments, provides a more efficient and effective authentication mechanism by providing a multi-factor and mutual authentication from a biometrics-based protocol in place of TLS. The BABE processing system protocol is biometrics independent, allowing multiple biometric types to be used to facilitate the mutual authentication. The BABE processing system protocol ensures that communicating parties never reveal their knowledge or biometric credentials to imposter recipients or man-in-the-middle observers. Additionally, the BABE processing system protocol overcomes the TLS limitation of mutual authentication procedures being dependent on personal digital certificates, by leveraging a user password in the BABE processing system protocol and providing for a strong, lightweight alternative to TLS. By using cryptography that does not require the support of a PKI, BABE processing system provides mutual authentication while avoiding the TLS server-specific authentication errors and user errors that have resulted in data breaches and phishing attacks. Further, the BABE processing system overcomes the cumbersome and process intensive key management limitations by securely transmitting users' biometric samples and providing verifiable re-enrollment of one or more users in a BSP's population. The secure transport and protection of the biometric data is in accordance with industry standards and allows users of the dynamic biometric enrollment system to restrict access to sensitive biometric data to those with a need-to-know. The biometric reference templates, biometric enrollment samples, and biometric verification samples can be securely stored, transferred, distributed, or used without loss of confidentiality. These problems arise out of the use of computers and the Internet, because biometric processing and key exchanges cannot exist without the use of computers and the Internet. Accordingly, problems relating to authentication between communicating parties arise out of computers and the Internet.

Further, the methods and systems described herein alleviate the strain on processing power and memory currently required to achieve multi-factor and mutual authentication. Additionally, the embodiments herein utilize a strong key exchange mechanism that utilizes a symmetric encryption and decryption method that may be 100-10,000 times faster than authentication protocols using asymmetric encryption algorithms, while maintaining the same, or greater, protection of the underlying passcode information in the authentication data exchange between the communicating parties. For example, the key exchange mechanism gives protection against objectively weak password strings by relying on knowledge shared by the communicating parties and providing for multi-factor authentication. The key establishment method provides for the highly desirable protocol property of forward secrecy, wherein participants choose fresh values each time they operate the protocol, without expending processing power typically used for protocols that use fresh values each time.

FIG. 1 is a flow diagram of a method 100 of enrolling at least one biometric enrollment sample of a user with a BABE processing system, according to an example embodiment. Specifically, the method 100 of the BABE processing system generating an ECM for the user. For example, the user may be an individual who operates the user computing system 304 of FIG. 3. The BABE processing system may be a financial institution that manages the BABE processing computing system 302 of FIG. 3. However, the method 100 may be similarly performed by other systems and devices.

At 102, the user initially enrolls with the BABE processing system by providing a secret knowledge factor and a second authentication factor associated with a user identifier. The enrollment process may include checking the identification credentials (e.g., state issued driver's license, birth certificate, etc.) of the user to confirm the user's identity. The user provides a secret knowledge factor. The secret knowledge factor is a something-you-know factor, for example a password string of "password ABC." In some embodiments, the secret knowledge factor may be transmitted only by having an employee of the BABE processing system enter the data into a computing system (e.g., an employee terminal connected to the server of the BABE processing system) during a person-to-person interaction. For example, the user walks into a branch location of the BABE processing system and initiates the authentication request via interaction with a teller at the branch. In other embodiments, the secret knowledge factor is shared using an encrypted, secure connection via the network 310. The second authentication factor may be a possession object or a biometric sample. The second authentication factor can subsequently be used to enroll an additional biometric with the BABE processing system, enroll a biometric with a third party, or be used in an authentication request.

The second authentication factor may be, for example, a possession object such as the magnetic strip data from a debit or ATM card, or the information commonly used for on line purchases from a user payment card. Possession objects (i.e., the "something-you-have factor") of any kind or format are supported by this invention, including RFID identifiers from tagged physical objects registered with the relying party as known user possessions. Alternatively, the possession object identifiers could be a key fob, a MAC address for a computing device, a coordinate location pairing, etc. In order to be authenticated, the user would have to possess the object identifier when providing the biometric sample. For example, the BABE processing system would reject a biometric sample (or fail a validation attempt by a relying party) if the provided biometric sample was extracted from a biometric sensor with the physical address "123" but the user identifier only enrolled a possession object identifier for biometric samples to be submitted from a biometric sensor with the physical address of "456." In some arrangements, the user has a fob that is the possession object identifier associated with the user identifier. While the biometric sample is captured, the user provides the value contained in the fob (e.g., the "something-you-have" factor), the value related to the biometric sample that includes a biometric message (e.g., the "something-you-know" factor), and biometric characteristics (e.g., the "something-you-are" factor). Alternatively, the second authentication factor may be in the form of a biometric sample, optionally including an identifier of the biometric technology type to be matched. The biometric sample may also be a more elaborate structure containing a URI that points to a BSP address and that contains in its query string the unique biometric reference template identifier to which the user claims their provided sample will match.

At 104, the BABE processing system receives and stored the user identifier, secret knowledge factor, and second authentication factor to mutually authenticate for future communications. The BABE processing system and user will subsequently use the secret knowledge factor (e.g., using a Password Authenticated Key Exchange Protocol) to establish secure communications and to mutually authenticate. For example, the encryption key can include a symmetric encryption key generated using the Diffie-Hellman ("D-H") key exchange algorithm or other password authenticated key exchange ("PAKE") protocols. In some arrangements, the PAKE protocol is ITU-T Recommendation X.1035 (2007). The PAKE used may comply with the standards outlined in the ISO/IEC 11770-4 standard.

At 106, the user provides a one or a plurality of biometric enrollment samples that are to be associated with the user identifier of the user. The biometric enrollment sample may include one or more samples from any of a plurality of biometric technologies (e.g., iris, voice, fingerprint, etc.). As will be appreciated, multiple raw biometric data enrollment samples may be captured during initial enrollment, allowing for future authentication of a wide variety of biometric enrollment samples. In some arrangements, the initial biometric enrollment sample is taken at the BABE processing system facility (e.g., a financial institution branch) using a biometric sensor. In other embodiments, the user must go to a BSP and have their plurality of initial biometric enrollment samples taken at an establishment managed by the BSP. However, in other embodiments, the initial biometric enrollment sample is taken on the user's computing system, for example on a mobile device. The biometric enrollment sample may be, for example, a fingerprint, a retina scan, a voice profile, or similar biometric.

In some arrangements, the user may specify or associate a possession object or information (e.g., credit card, debit card, DOB, passport information) with a biometric sample. Beneficially, the association allows for the BABE processing system to receive a biometric authentication sample of a biometric type for a user, authenticate the sample and user, and, if the authentication is positive, provide the possession object with the positive authentication event. For example, the user may want to associate a credit card with a fingerprint biometric, allowing the user to provide a fresh fingerprint biometric to a third party and have the BABE processing system return the credit card information (e.g., number, ccv, expiration date) and positive authentication result to the third party. Beneficially, the user may pay for items by providing a fingerprint and BABE processing information (e.g., the ECM, as described in greater detail below) to a third party.

At 108, the user computing system creates a symmetric key using an agreed upon encryption algorithm. As previously discussed, both parties must have pre-established the shared secret that will be used by both parties to generate the same keys. A symmetric (e.g., cryptographic) key protects the confidentiality of user credentials and other message data transferred during operation of the BABE processing system protocol. Using the protocol, a cryptographic key is derived using the secret knowledge factor. The D-H key agreement allows two parties to establish a cryptographic key without ever actually exchanging the private value. The D-H key establishment provides forward secrecy, a highly desirable protocol property, when participants choose fresh random values each time they operate the protocol, therefore, if a compromise of the long-term keys occurs, it does not compromise the session keys established in previous protocols run involving those principals.

At 110, the user computing system encrypts the message (e.g., biometric enrollment sample and, optionally, the second authentication factor) using the symmetric key and the encrypted message is transmitted to the BABE processing system with a user identifier. If the user is authenticated, the generated cryptographic key may be used to encrypt future communications between the parties, including the initial enrollment of one of more biometric enrollment samples. Alternatively, in some arrangements, the initial set up of the secret knowledge factor includes enrollment of one or more biometric enrollment samples. In those arrangements, the encrypted message sent at 106 includes at least biometric enrollment sample to be enrolled as well as a cleartext of the secret knowledge factor to provide multi-factor authentication. For example, the user could provide the biometric enrollment sample and also type in the secret knowledge factor to the same device and both may be encrypted by the symmetric key.

At 112, the BABE processing system receives the encrypted message and the user identifier from the user computing system. In some embodiments, the message may only be transmitted by an employee of the BABE processing system extracting the data at a BABE processing system computing system (e.g., an employee terminal connected to the server of the BABE processing system) during a person-to-person interaction. For example, the user may walk into a branch location of the BABE processing system and initiate the authentication request via interaction with a teller at the branch. However, in other embodiments, the encrypted message can be transmitted by any computing system. For example, the user may log onto a webpage for the BABE processing system using a laptop and provide a voice biometric enrollment sample using a built-in microphone and type out the user secret and user identifier within fields on the webpage.

At 114, the BABE processing system retrieves the stored secret knowledge factor associated with the user identifier and generates the decryption key. As previously discussed, both parties must have pre-established the shared secret that will be used by both parties to generate the same keys.

At 116, the BABE processing system decrypts the encrypted message to retrieve the biometric enrollment sample(s). The BABE processing system retrieves the shared secret password associated with the user identifier and generates a symmetric key using the stored password/shared secret, for the user identifier on file. The key is generated using an agreed upon commutative encryption algorithm, for example, the D-H protocol, based on the user secret. The generated cryptographic key is then used to decrypt the message and retrieve the biometric enrollment sample(s). In some arrangements, the second authentication factor retrieved from the encrypted message is authenticated against the second authentication factor established at initial enrollment at 102.

At 118, the BABE processing system processes each provided biometric enrollment sample using a processing algorithm to generate a biometric reference template for each biometric enrollment sample. In some arrangements, the BABE processing system may use one or more BSPs to process the biometric enrollment sample(s) as a BSP may have a superior processing algorithm or biometric technology. This change can include a transition to a new biometric technology for generating the biometric reference templates. For example, a first BSP is used to process the biometric enrollment data related to a user's iris and a second BSP is used to process a fingerprint. Each biometric reference template is associated with the user identifier.

At 120, the BABE processing system generates the ECM and associates the ECM with the user identifier. The ECM includes one or more unique biometric reference template identifiers—now associated with the identity of the enrolled user—and a URI of the BSP (e.g., first BSP, BABE processing system, second BSP) who can match the user's biometric samples of a given biometric type during subsequent user authentication attempt. The most common form of URI is a Uniform Resource Locator ("URL"). The computing system may encrypt the URI with the encryption key so as to cryptographically bind the storage location identifier with each of the hash of the record and the biometric sample such that the ECM includes the encrypted storage location identifier. The ECM provides the user with "biometric authentication portability," at the user can now authenticate their vetted identity by providing their biometric sample along with the URI of the BSP that can match that sample, and the biometric reference template identifier assigned by the BSP at enrollment. In some arrangements, the ECM may include a biometric type identifier or an associated information (e.g., that the biometric reference template is linked to a user credit card or DOB) identifier.

At 122, the BABE processing system encrypts the ECM using the symmetric key and the encrypted message is transmitted to the user computing system. In some arrangements, an event journal entry, identifying the generation of the ECM and biometric reference templates are stored in a repository or blockchain that allows auditing by authorized entities while still being restricted through use of a private repository or blockchain or using cryptography in a shared repository or blockchain. The cryptography may be tokenization or other forms of encryption and/or may include the generation of a hashed, tokenized, or encrypted manifest that identifies and associates protected information with authorization access. At 124, the user receives the encrypted ECM.

Beneficially, once the user initially enrolls their biometric(s), the user can authenticate with any third party (e.g., a bank, merchant, government agency, etc.) that trusts the BABE processing system, or BSP, to perform biometric matching of the vetted user identity. As stated above, in some arrangements, the BABE processing system may associate a possession object or information with a biometric reference template identifier. For example, in one implementation, a user may want to withdraw funds from a third party ATM. To validate the withdrawal, a biometric sample and the authentication information in the ECM for the associated biometric sample type may be provided to the third party, with the BABE processing system returning a financial institution identifier, an account number, and/or a customer account number upon a positive authentication event.

Subsequently, the user may provide an additional biometric to be added to the ECM and be usable for authentication events with third parties. In some arrangements, the user may initiate mutual authentication with the BABE processing system before initiating the enrollment and transmission of the new biometric enrollment samples. First, the user uses the symmetric key generated from the shared secret knowledge factor to encrypt a challenge question message. The challenge question may require a response answer from the relying party. If the relying party responds appropriately, then the user may mutually authenticate the relying party. In some arrangements, the user includes the second authentication factor in the challenge message. The user transmits the encrypted challenge message and user identifier to the BABE processing system. The BABE processing system receives the encrypted challenge message and generates a decryption key using the shared secret knowledge factor associated with the user identifier. The BABE processing system may encrypt and transmit a response answer in response to the retrieved, decrypted challenge message. Upon receipt and verification of the response answer, the user and BABE processing system may mutually. As will be appreciated, the challenge question may provide protection against man-in-the-middle or phishing attacks because an unauthorized source would lack the credentials and knowledge to respond appropriately to the challenge question. Once mutually authenticated, the user provides a new biometric enrollment sample, either to be added to the ECM as a new biometric reference template identifier or to replace a biometric reference template identifier.

As will be appreciated, the method 100 is transparent to the user and is easy to use. From the user's point of view, the user has to provide only a secret knowledge factor and/or second authentication factor along with a biometric sample to enroll in the BABE processing system. The user enters the secret knowledge factor, for example "password123," and provides a biometric sample into a biometric sensor in communication with the BABE processing system. The user then receives an ECM or updated ECM that allows for portable biometric authentication.

In some arrangements, the BABE processing system utilizes parameterized types defined in the ITU-T Rec. X.683| ISO/IEC 8824-4 Information technology Syntax Notation One (ASN.1): Parameterization of ASN.1 specifications. The parameterizations allow the BABE processing system to reuse a structure to define types multiple times with variations in the components of a structure indicated by a parameter. Typically, the parameter is an information object set used to form a table constraint on the components of the structure. One such arrangement in the following type definition is:

Possession::=FactorType{{PossessionSet}}

The above argument is the information object set PossessionSet. The outer pair of curly brackets are ASN.1 production symbols, which instruct a programming language code generation tool to produce something—in this case the body of a parameterized type. The innermost pair of curly brackets instructs the tool to populate the parameter throughout the produced parameterized type. The end result of the invocation of a parameterized type is simply the result of instructions to an ASN.1 programming language code generation tool (i.e., an ASN.1 compiler) to produce a text substitution prior to compilation. The definition of type Possession is based on the FactorType parameter type. This produces the following final definition of type Possession Possession::=SEQUENCE {
   type FACTOR.&id({PossessionSet}),
   value   FACTOR.&Type({PossessionSet}{@type})
     OPTIONAL
}
FactorType {FACTOR:IOSet}::=SEQUENCE {
   type FACTOR.&id({IOSet}),
   value FACTOR.&Type({IOSet}{@type}) OPTIONAL
}

As shown above, the FactorType has two components named type and value. The types of these components are based on an ASN.1 information object class, Factor which has two fields, &id and &Type., expressed as Factor.&id and Factor.&Type. The parentheses characters instruct runtime tools to apply a constraint on the valid values of the defined type. The notation @type tells the compiler to generate code used by the runtime tool to apply a table constraint on the valid values of the value component type based on the value of the type component. The single parameter, IOSet represents both an ASN.1 information object set. The table constraint enforced at runtime is formed from the rows and columns of an information object set such as PossessionSet in the definition of type Possession. Each object in the set is defined in terms of the "WITH SYNTAX" notation that can be provided as a convenience in the definition of a class.

A class Factor is defined by an &id and an &Type. The &id field represents a value of type Object Identifier. The Unique notation indicates that each object in an information object set of class Factor must occur no more than one time. This is required to properly implement a table constraint that is unambiguously defined and only enforced at runtime. Given a set of unique information objet identifier 'rows', a tool can locate the row that matches a value in a constrained type, then apply the constraint properly to the paired constrained component of that type. The &Type field represents an open type, a value of any ASN.1 type in its encoded form. An open type value is independent of any programming language, operating system, or hardware. It is in a form suitable for unambiguous information exchange between any two communicating parties. As shown below, the notation "WITH SYNTAX {OID &id [PARMS &Type] }" specifies how information objects of class Factor are specified. When such notation is encountered by an ASN.1 compiler, it is instructed to produce an object in which the text OID heralds an information object identifier and the text PARMS, if present, heralds an open type. The square brackets indicate that valid objects of class Factor need not specify a &Type field. An example class Factor is defined as:

FACTOR::=CLASS {
   &id OBJECT IDENTIFIER UNIQUE,
   &Type OPTIONAL
}
WITH SYNTAX {OID &id [PARMS &Type] }

As an example arrangement, an information object set used to constrain the valid values of the components of type Possession is defined as:

PossessionSet FACTOR::={
   {OID paymentCard PARMS Card}|
   {OID secureToken PARMS Token}|
   {OID taggedObject PARMS Identifier},
   . . . —Expect additional possession factor objects—
}

As shown above, the type Possession has objects defined as rows, with each row containing two columns: one for a unique information object identifier and another for an ASN.1 type. The ellipsis characters are a notation that instructs an ASN.1 compiler to generate code that expects to handle additional objects in the future without the runtime parser raising an error. This notation is referred to as an extension marker. A table constraint cannot be specified in some schema definition languages, such as XSD, the XML Schema Definition language. XSD does not permit resolutions of constrained type definitions to depend on notation from a separate line. As will be appreciated, the above schema is designed to simplify message parsing by an interpreter. ASN.1 was designed to be parsed only once, when compiled rather than interpreted. In the case of the table constraint applied to type Possession, the definition of the type in the value component depends on resolving the value of the type component.

In some arrangements, the BABE processing system and may be used to authenticate a biometric included in a biometric signed document. For example, the ECM may include a biometric electronic signature authenticated key exchange ("BESAKE") token modified to include the evidence biometric sample including the ECM information described herein. Details of the BESAKE token can be found in U.S. patent application Ser. No. 15/623,213, filed Jun. 14, 2017 and entitled "Biometric Electronic Signature Authenticated Key Exchange Token," the entire disclosure of which is incorporated herein by reference. According to some arrangements, a signing party (e.g., user) can utilize an ECM to provide authentication information for a biometric-based electronic signature. In some arrangements, the biometric-based electronic signature may be on a document or record. The signing party provides a biometric sample for authentication. The biometric sample contains, and is parsed into, secret knowledge data, such as a "something-you-know" weak secret (e.g., a password), and biometric matching data, such as a "something-you-are" strong secret (e.g., a voice profile, fingerprint, etc.). Furthermore, the biometric sample may also include a biometric sample, including one or more components, confirming the signing party's agreement to the terms of the electronic agreement and intention to sign the electronic agreement (e.g., a confirming phrase, a visual agreement and confirmation of intent, a thumbprint, etc.). For example, the biometric sample may include an approval sample, comprising a biometric representation of the signing party's approval of terms of an electronic agreement, and an authentication identifier, comprising the information in the ECM related to the biometric sample type, thereby allowing the authentication of the approval sample.

Figure 2:
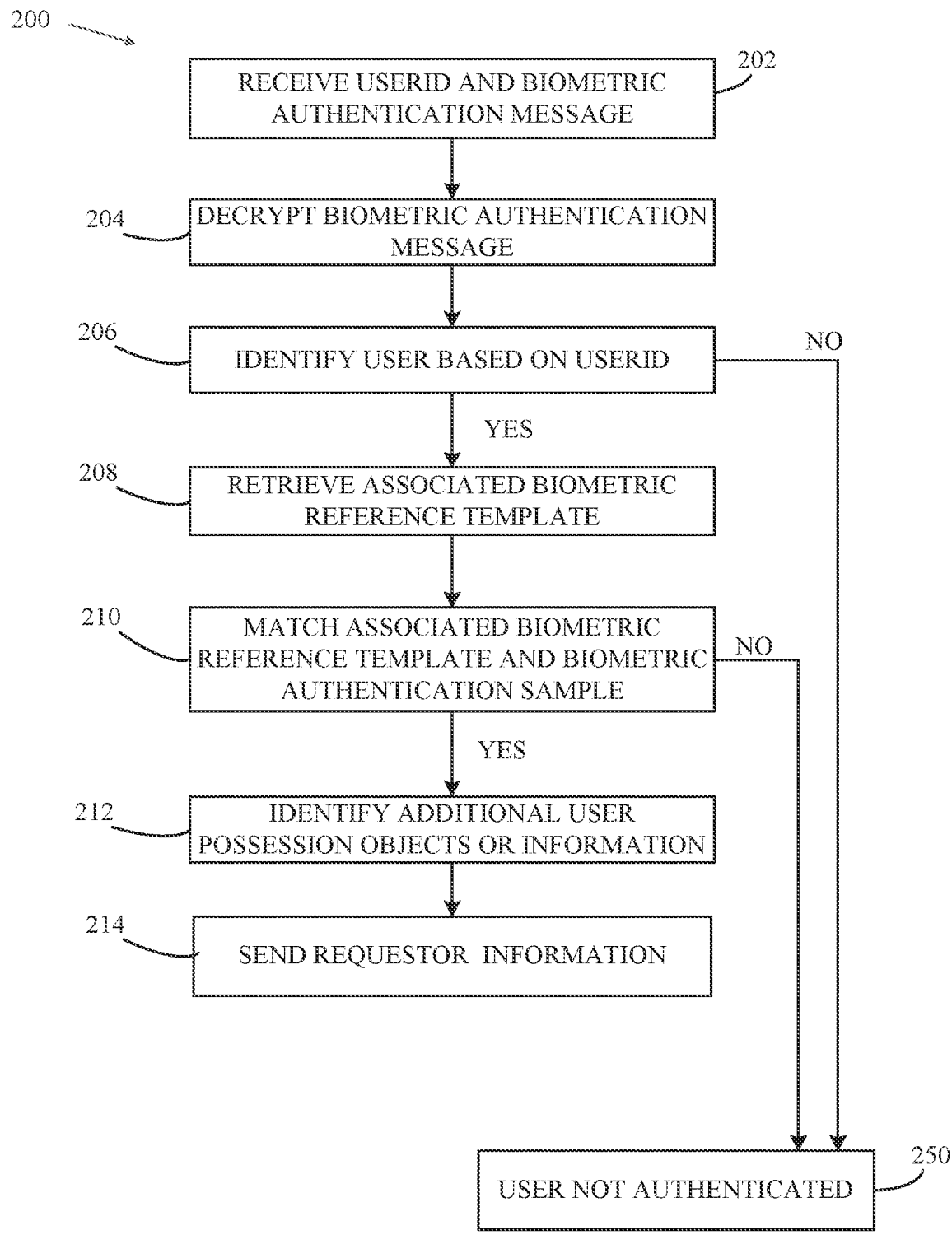
FIG. 2 is a flow diagram of a method of authenticating a biometric authentication sample of a user with a BABE processing system, according to an example embodiment.

FIG. 2 is a flow diagram of a method 200 of authenticating a biometric authentication sample of a user with a BABE processing system, according to an example embodiment. Specifically, the method 200 of the BABE processing system authenticating a provided biometric authentication sample against an associated biometric reference template. For example, the relying party may be an individual who operates the relying party computing system 306 of FIG. 3. The BABE processing system may be a financial institution that manages the BABE processing computing system 302 of FIG. 3. However, the method 200 may be similarly performed by other systems and devices.

The authentication method 200 begins when the BABE processing system receives a biometric authentication request message at 202. The biometric authentication request message may be received from a user computing system or a relying party computing system. The biometric authentication request message includes a user identifier (e.g., provided user identifier), a biometric authentication sample, and a biometric reference template identifier and URI that corresponds to the biometric type of the biometric authentication sample. In some arrangements, all of the biometric reference template identifiers and associated URIs are transmitted, thereby relying on the BABE processing system to identify the biometric type in the biometric authentication sample and identify the corresponding biometric type in one of the biometric reference template identifiers.

In some arrangements, the biometric authentication request message is encrypted and the BABE processing system decrypts the message at 204. Depending on the set up of the BABE processing system, the biometric authentication request message may be received by a relying party directly, or by way of a user computing system. In one arrangement, the relying party receives from a user the user identifier, biometric reference template, and URI, un-encrypted. The user may provide these by presenting a mobile computing system, QR code, or other identification providing mechanism. The relying party then encrypts the biometric sample using a PKI protocol or -AKE protocol the relying party has established with the BSP identified in the URI. In some arrangements, the relying party encrypts the biometrics sample, biometric reference template identifier, URI, and, optionally, the user identifier using a PKI protocol or -AKE protocol the relying party has established with the BSP identified in the URI. The BABE processing system (or BSP) can decrypt the biometric authentication request message using the PKI or -AKE protocol used by the relying party to encrypt the biometric authentication request message. In another arrangement, the user computing system provides an encryption key based off of the shared secret knowledge factor to the relying party. Subsequently, the relying party encrypts the biometric authentication request message using the -AKE protocol and provided encryption key. In order to decrypt the encrypted biometric information, the BABE processing system would generate a decryption key derived from the shared secret knowledge factor associated with the user identifier.

At 206, the BABE processing system identifies the user based on a stored user identifier. If no stored user identifier matches the user identifier in the biometric authentication request message, authentication fails at 250. If the biometric authentication request message is unable to be properly decrypted by the symmetric key using the stored shared secret knowledge factor, the authentication fails at 250. In some arrangements, a second authentication factor (e.g., passcode, credit card swipe, etc.) is transmitted with the biometric authentication request message. If the second authentication factor matches the stored second authentication factor, the authentication fails at 250.

In some arrangements, the biometric authentication message may further include a challenge question. While not shown, the BABE processing system may also transmit to the user or relying party (e.g., transmitter of the biometric authentication message), a challenge response comprising a response answer to the challenge question. The response answer may be encrypted using a response key generated using the stored secret knowledge factor as an input to the password authenticated key exchange protocol, for example the cryptographic symmetric key. The BABE processing system mutually authenticates the relying party and the BABE processing system by decrypting the challenge response using a response decryption key generated using the secret knowledge factor as an input to the password authenticated key exchange protocol to retrieve the response answer.

At 208, the BABE processing system retrieves the biometric reference template associated with the biometric reference template identifier in the biometric authentication request message. In some arrangements, where the BSP and BABE processing system are separate computing entities, the BABE processing system may request the biometric reference template associated with the biometric reference template identifier. In other arrangements, the BABE processing system may pass along an authentication request for the biometric reference template associated with the biometric reference template identifier and biometric authentication sample to the BSP for authentication.

At 210, the BABE processing system matches (e.g., verifies) the biometric reference template and provided biometric authentication sample. The verification proves is a "one-to-one" comparison that entails comparing a biometric match template generated from the transmitted authenticated biometric sample and the biometric reference template stored in a database of the BABE processing system. The BABE processing system generates a match value at 208. The match value is a binary value indicating a biometric match or a biometric non-match. If the match value is positive, the biometric authentication sample does match the biometric reference template. If the match value is negative, the biometric authentication sample does not match the biometric reference template and the user's biometric sample is not authentication at 250.

At 212, the BABE processing system determines if there are additional user characteristics, attributes, possession objects, or other data that need to be returned with a positive match value. In some arrangements, the biometric authentication request message includes a request for a specific additional information of the user. The additional information includes, but is not limited to, a user account at a financial institution, a credit card, date of birth, address, academic credentials, security clearance, ownership, possession, and other user attributes, characteristics, or possessions.

At 214, the BABE processing system transmits the authentication request result message. The authentication result includes match value and/or any additional information requested in the biometric authentication request. The authentication request result message may be encrypted using the same protocol of the received encrypted biometric authentication request at 202.

Figure 3:
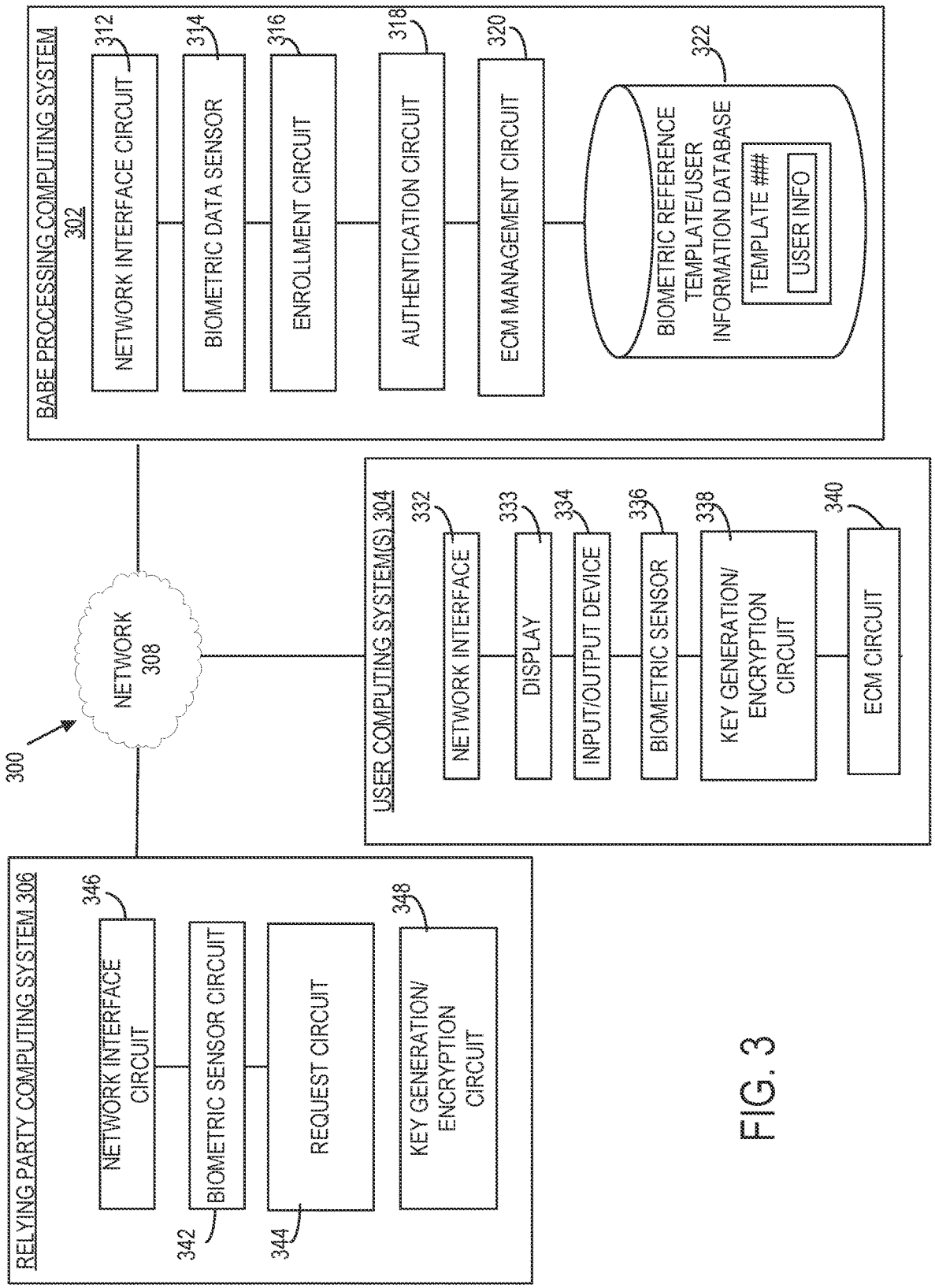
FIG. 3 is a schematic diagram of a dynamic biometric enrollment system, according to an example embodiment.

By way of example of method 200, the relying party may be a beverage vendor that wants to know if the user is of legal age to drink. Through a biometric sensor connected to ta relying party computing system, the relying party captures a biometric authentication sample (e.g., fingerprint) of the user requesting an alcoholic beverage. The user provides the biometric reference template identifier, URI, and user identifier to the relying party in the form of a QR code that the relying party computing system scans. The relying party computing system identifies the BSP associated with the URI and determines the appropriate, if any, encryption needed to conduct secure communications with the BSP. In this arrangement, the BSP manages the BABE processing system. The relying party establishes a secure communication channel (e.g., through -AKE, PKI, or other secure communications) and transmits the biometric authentication sample, biometric reference template identifier, URI, and user identifier to the BSP. The BSP verifies the biometric authentication sample against the biometric reference template in the FIG. 3 is schematic diagram of an BABE processing system 300 for generating and authenticating biometric samples of a user. The BABE processing system 300 includes a BABE processing computing system 302, a user computing system 304, and a relying party computing system 306. As shown in FIG. 3, the BABE processing computing system 302 includes a BSP computing system, in other words, the biometric enrollment and authentication is accomplished within the BABE processing computing system 302. In some arrangements, a BSP computing system may be separate from the BABE processing computing system 302.

The network 310 is any suitable Local Area Network (LAN) or Wide Area Network (WAN). For example, the network 310 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The network 310 is structured to permit the exchange of data, values, instructions, messages, and the like between the BABE processing computing system 302, the user computing system 304, the relying party computing system 306, and/or a BSP computing system.

The mechanisms allow for the initial enrollment of biometric samples, generation of an ECM for portable authentication, enrollment of additional biometric samples, and/or authentication of a biometric sample provided by a third party. The BABE processing system 300 can securely transmit biometric information, securely transmit associated user information, facilitate subsequent enrollment or third-party enrollment of a user, and facilitate authentication of the user. The BABE processing system 300 may be used to implement the enrollment method 100 of FIG. 1 as discussed above or the authentication method 200 discussed above in reference to FIG. 2. Although various embodiments are described in connection to users of biometric systems, it should be understood that the systems and methods described herein may similarly be used to provide biometric authentication in any type of system, such as enterprise security and other types of systems. While the BABE processing computing system 302 is shown as a BSP computing system performing some of or all of the functions, in some embodiments, the BSP computing system and the BABE processing computing system 302 are separate. In some arrangements, the BSP computing system and BABE processing computing system are separate entities that are managed and operated by a financial institution.

The BABE processing computing system 302 includes a network interface circuit 312, a biometric sensor 314, an enrollment circuit 316, an authorization circuit 318, an ECM management circuit 320, and a biometric reference template and associated information database 122. The BABE processing computing system 302 may, for example, include one or more servers each with one or more processors configured to execute instructions stored in a memory, send and receive data stored in the memory, and perform other operations to implement the financial services described herein. The network interface circuit 312 is structured to facilitate operative communication between the BABE processing computing system 302 and other systems and devices over the network 310.

The biometric sensor 314 is structured to capture a biometric sample from an individual and to process the biometric sample to generate the biometric data. The biometric sample can be for enrollment or a subsequent authentication event. The biometric data may be referred to as "raw" biometric data. For example, the sensor 314 can be of any biometric technology structured to read a fingerprint, voice print, or other biometric marker. Generally, the biometric sensor 314 is any device that supports the capture of biometric data. In some embodiments, the request is initiated by an employee of the BABE processing system 300 entering data into a computing system (e.g., an employee terminal connected to the server of the BABE processing computing system 302) during a person-to-person interaction. For example, the user (e.g., the customer) may walk into a branch location of the BSP and initiate an enrollment request, a biometric reference template update, or a service requiring biometric authentication.

In some arrangements, the biometric sample captured from the individual is received by the BABE processing computing system 302. In those arrangements, the received biometric sample may also include a plurality of source identifiers. The plurality of source identifiers can include a device identifier uniquely identifying the device used to capture the at least one biometric sample, a location at which the biometric sample was captured, a device MAC address, or the like.

The enrollment circuit 316 is structured to securely store the initial enrollment samples, generate and associate a user's biometric reference template with a user identifier and any other user information (financial institution accounts, characteristics, etc.), and facilitate the generation of the ECM of the user. Generally, the enrollment circuit 316 is structured to facilitate enrollment, the process through which the user's identity is bound with biometric data and entered into the system database 322 as a biometric reference template. In some arrangements, the enrollment process includes securely storing user data (e.g., financial institution account information, user characteristics or attributes, etc.) along with the biometric reference template. In generating a biometric reference template, the enrollment circuit 316 first receives a biometric enrollment sample and a user identifier. In some arrangements, a plurality of biometric enrollment samples are captured using a plurality of biometric technologies. The enrollment circuit 316 processes the biometric enrollment sample to generate the biometric data using a processing algorithm. After the biometric enrollment data is processed to generate the biometric reference template, the raw biometric enrollment sample may be discarded or securely stored in the biometric reference template database 322. The biometric data is used to generate the biometric reference template. The biometric reference template includes a template identifier uniquely identifying the biometric reference template. The template identifier is associated with the user identifier and used to locate the biometric reference template in the database 322. The enrollment circuit 316 also facilitates the enrollment process described in greater detail above in method 100 of FIG. 1.

The authorization circuit 318 is structured to compare a biometric sample received from the user computing system 304 or the relying party computing system 306 to the biometric reference template for the corresponding user identifier and biometric type. The authentication circuit 318 compares the biometric sample to the biometric reference template retrieved from the biometric reference template database 322 for the provided user identifier. The comparison can include using a biometric processing algorithm or a biometric matching algorithm. If the sample matches the reference template, the authentication circuit 318 provides a positive authentication value to the biometric authentication circuit. In some arrangements, the authentication circuit 318 will provide a negative matching value if there is no matching user identifier in the biometric reference templates database 322 or if the user identifier does not have a biometric reference template for the biometric type of the biometric sample. In some embodiments, the authentication circuit 318 matches the possession object identifier or other second authentication factor with the biometric sample to a stored possession object identifier or other second authentication factor associated with the user identifier.

The ECM management circuit 320 facilitates the ECM to the user that has provided one or more biometric enrollment samples. Additionally, the ECM management circuit 320 ensures that an entity requesting the biometric enrollment samples for enrollment or for authentication is authorized. In an enrollment request, the authorized entity would be the BSP that performed the initial enrollment using the biometric enrollment samples or the user. In an authorization request, an authorized entity would be one that possesses the user identifier of a user that has biometrics stored in the biometric enrollment samples (e.g., the user arrives at the entity location, is required to provide a biometric, and provides information for retrieving the user's biometric enrollment sample). In some arrangements, the relying party computing system 306 is a subscriber to the BABE processing system 300, thereby allowing the relying party computing system 306 to retrieve an authentication result by providing a user identifier because the user providing the biometric authentication sample has been previously vetted.

Further, the ECM management circuit 320 is structured to encrypt information sent to the user computing system 304, relying party computing system 306, or other third party computing systems. The ECM management circuit 320 uses the cryptographic, symmetric key generated with the agreed upon -AKE protocol and shared secret knowledge factor. In some arrangements, the key generation and management is done with a dedicated key generation/encryption circuit. Additionally, the ECM management circuit 320 can also facilitate the association and transmission of user possession object or information is associated each biometric reference template identifier. For example, the user's fingerprint may be associated with the retrieval of a credit card with a financial institution, the user's driver's license, and a SSN, whereas the user's iris scan is associated with the retrieval of just the driver's license.

The biometric reference template and associated information database 322 is structured to store the biometric reference templates, user attributes, characteristics, and possession objects, and corresponding user identifiers for all of the users enrolled in the biometric authentication service with the BABE processing computing system 302. The biometric reference template and associated information database 322 can update or replace an existing biometric reference record with a new biometric reference record when the user provides an additional biometric sample. The biometric reference template and associated information database 322 provides a specific biometric reference template in response to a verification request for a user identifier, which may be analyzed to determine whether a specific biometric sample matches the specific biometric reference template.

In some arrangements, the BABE processing computing system 302 includes a raw biometric sample database (not shown) structured to store, off of the network 310, the raw, biometric data for all users stored in the BABE processing computing system 302. The raw biometric data is stored so that it can be reprocessed using a new processing method if the need arises. For security purposes, the raw biometric sample database can be stored off-network and only accessed to add new raw biometric data to the database or to reprocess the raw data using a new algorithm, thereby preventing access through an outside attack.

The user computing system 304 include a network interface 332, a display 333, an input/output device 334, a biometric sensor 336, a key generation/encryption circuit 338, and an ECM circuit 340. The network interface 332 is structured to facilitate operative communication between user computing system 304 and other systems and devices over the network 310. The user computing system 304 may include smartphones, tablet computing systems, laptop computing systems, desktop computing systems, PDAs, smart watches, smart glasses, tablets, etc.

The display 333 is structured to present authentication instructions and information and, if authenticated, account information, transaction information, and the like, to customers. The input/output device 334 is structured to receive input from the customer via the user computing system 304. The input/output device 334 may allow a user to provide a user identifier, a secret knowledge factor, etc. Additionally, the input/output device 334 may allow a customer to select a biometric type from a list of possible biometric authenticators. For example, the customer can select to provide a fingerprint, voice, or video biometric sample. The input/output device 334 may include a keyboard, a mouse, a touchscreen, a biometric sensor (e.g., a fingerprint sensor), a microphone, a camera, etc. In some embodiments, the input/output device is the same as the biometric sensor 336.

The biometric sensor 336 is structured to read a fingerprint, voice print, or other biometric marker. Generally, the biometric sensor is any device or combination of devices that support the capture of biometric something-you-are matching data using a context useful for collecting something-you-know information needed to operate the -AKE protocol.

The key generation/encryption circuit 338 is structured to derive a cryptographic key using an agreed-upon commutative encryption algorithm and encrypt the authentication message with the generated key. The commutative encryption algorithm can be, for example, the D-H protocol. The key generation/encryption circuit 338 derives a cryptographic key based on the shared user secret. As discussed previously, both parties must have pre-established shared secret that will be used by both parties to generate the same keys. The generated key may be used to encrypt the initial authentication message and, if authenticated, future communications between the parties.

The key generation/encryption circuit 338 uses the generated key to encrypt the biometric sample taken from the biometric sensor 336. The biometric sample includes a biometric message (e.g., the something-you-know factor) and biometric characteristics (e.g., the something-you-are factor). In some embodiments, the encrypted message also includes the user secret, encrypted by the key. The encrypted message is then sent along with the user identifier to the authenticating party on the financial institution computing system 102. In some arrangements, the encrypted message is then sent along with the user identifier to the authenticating party on a proxy of the financial institution computing system 102.

The key generation/encryption circuit 338 uses the generated key to encrypt the biometric sample taken from the biometric sensor 336. The biometric sample includes a biometric message (e.g., the something-you-know factor) and biometric characteristics (e.g., the something-you-are factor). In some embodiments, the encrypted message also includes the user secret, encrypted by the key. The encrypted message is then sent along with the user identifier to the BABE processing computing system 302 to add the biometric sample to the ECM associated with the user identifier or to initiate an authentication request. In one arrangement, the user provides the biometric sample to retrieve a user possession object or information back, for example, whether the user is of legal age to consume an alcoholic beverage. In some arrangements, the encrypted message is then sent along with the user identifier to the relying party computing system 306.

The ECM circuit 340 securely stores and facilitates the use of the biometric reference template identifiers and associated URIs for the user that are enrolled with the BABE processing system 300. The ECM circuit 340 contains one or more unique biometric reference template identifiers associated with the identity of the enrolled user (e.g., user identifier). Each biometric reference template identifiers are to a URI of the BSP who can match the user's biometric samples of a given. In some arrangements, the BSP is associated with the BABE processing computing system 302. The ECM circuit 340 facilitates the retrieval and transmission of the proper biometric type and information of the user during subsequent authentication attempts with the BABE processing computing system 302 and/or the relying party computing system 306. In arrangements, where the information is provided to the relying party computing system 306, the relying party computing system 306 facilitates the transmission, and encryption if necessary, of the biometric information in the ECM of a similar biometric type of the biometric authentication sample. The ECM circuit 340 can also provide what user possession object or information is associated each biometric reference template identifier. For example, the user's fingerprint may be associated with the retrieval of a credit card with a financial institution, the user's driver's license, and a SSN, whereas the user's iris scan is associated with the retrieval of just the driver's license.

The relying party computing system 306 includes a network interface 346, a biometric sensor 342, and a request circuit 344. The network interface 346 is structured to facilitate operative communication between the relying party computing system 306 and other systems and devices over the network 310.

The biometric sensor 342 is structured to read a fingerprint, voice print, or other biometric marker. Generally, the biometric sensor is any device or combination of devices that support the capture of biometric something-you-are matching data for collecting something-you-know information needed to operate a -AKE protocol.

The request circuit 344 is structured to request authentication of the biometric sample captured from the user. The request circuit 344 receives a user identifier, URI, and biometric reference template identifier (e.g., from the user's ECM) from the user computing system 304. Generally, the request circuit 344 transmits an authentication request, which includes the received information and the user-provided biometric sample, to the BABE processing computing system 302 (or BSP computing system) to authenticate the user. The authentication process is explained in greater detail above in reference to method 200 of FIG. 2.

In some arrangements, the request circuit 344 encrypts the biometric authentication request message through a key generation/encryption circuit 348. In those arrangements, the biometric authentication request message is encrypted. Depending on the set up of the BABE processing system 300, the biometric authentication request message may be received by a relying party computing system 306 directly, or by way of a user computing system 304. In one arrangement, the relying party computing system 306 receives from a user the user identifier, biometric reference template, and URI, un-encrypted. The user may provide these by presenting a mobile computing system, QR code, or other identification providing mechanism. The relying party computing system 306 then encrypts the biometric sample using a PKI protocol or -AKE protocol the relying party has established with the BABE processing computing system 302 (or BSP computing system) identified in the URI for authentication. In some arrangements, the relying party computing system 306 encrypts the biometrics sample, biometric reference template identifier, URI, and, optionally, the user identifier using a PKI protocol or -AKE protocol the relying party has established with the BSP identified in the URI. The BABE processing computing system 302 (or BSP) can decrypt the biometric authentication request message using the PKI or -AKE protocol used by the relying party computing system 306 to encrypt the biometric authentication request message. In another arrangement, the user computing system 304 provides an encryption key based off of the shared secret knowledge factor to the relying party. Subsequently, the relying party computing system 306 encrypts the biometric authentication request message using the -AKE protocol and provided encryption key. In order to decrypt the encrypted biometric information, the BABE processing computing system 302 would generate a decryption key derived from the shared secret knowledge factor associated with the user identifier.

While not shown, in some arrangements, a time stamp token ("TST") may be requested from a time stamp authority ("TSA"), for example a TSA computing system. In some arrangements, the TST is requested by generating a hash of the record and the biometric sample by the computing system, which is used as an input to a trusted time stamp process. For example, in some arrangements, the hash is transmitted to the TSA, which cryptographically binds the hash to a time stamp to generate the TST. The computing system may retrieve the TST including the hash cryptographically bound to the time stamp. The TST can be subsequently included in the encryption algorithm as the plaintext along with the biometric sample provided during enrollment or used in the ECM for a biometric reference template identifier. The time stamp token may be subsequently validated by verifying that the time stamp token was generated using the hash. In some arrangements, the TST may be cryptographically bound to the biometric sample.

Referring to FIG. 4, an example schema named BABE-schema 400 is shown, according to an example embodiment. The BABESchema 400 may be used in the BABE processing system 300 of FIG. 3 and/or may be used in conjunction with methods 100 and 200 of FIGS. 1 & 2.

The embodiments described herein have been described with reference to drawings. The drawings illustrate certain details of specific embodiments that implement the systems and methods described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be remote processors (e.g., a cloud based processor). Alternatively or additionally, the one or more processors may be internal and/or local to the apparatus. In this regard, a given circuit, or components thereof, may be disposed locally (e.g., as part of a local server, a local computing system, etc.) or remotely (e.g., as part of a remote server such as a cloud based server). To that end, a "circuit," as described herein, may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data that cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick, camera, microphone, or other input devices performing a similar function. Comparatively, the term "output device," as described herein, may include any type of output device including, but not limited to, a computer monitor, printer, facsimile machine, or other output devices performing a similar function.

The present application may be used in conjunction with the transfer of assets, funds, currencies, etc. Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, ERC 20, and the like. Any foregoing references to blockchains or repositories are intended to include any distributed ledgers. Examples of distributed ledgers include R3CEV Corda, Hyperledger, Ethereum, and the like.

It should be noted that, although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed:

1. A method, comprising:
receiving, by a computing system, encrypted biometric enrollment data and a user identifier of a user, the encrypted biometric enrollment data comprising at least one biometric enrollment sample extracted from a biometric sensor associated with a physical address, the at least one biometric enrollment sample encrypted using an encryption key;
matching, by the computing system, the user identifier with a stored user secret;
deriving, by the computing system, a decryption key based on the stored user secret associated with the user identifier;
decrypting, by the computing system, the encrypted biometric enrollment data using the decryption key to retrieve a stored physical address;
in response to the physical address matching the stored physical address, generating, by the computing system, a biometric reference template identifier uniquely identifying a biometric reference template associated with the at least one biometric enrollment sample, and a uniform resource locator associated with a biometric service provider that subsequently authenticates the user;
encrypting, by the computing system using the encryption key, an enrollment confirmation message associated with the user identifier and comprising the biometric reference template identifier and the uniform resource locator;
storing, by the computing system on a repository, a generation of at least one of the biometric reference template or the enrollment confirmation message; and
transmitting the encrypted enrollment confirmation message to the user to allow the user to be authenticated with third party entities that trusts the computing system.

2. The method of claim 1, further comprising establishing, by the computing system, an account for a user including the user identifier and the stored user secret, wherein the establishing the account for the user comprises verifying an identity of the user.

3. The method of claim 1, further comprising authenticating, by the computing system, the user by matching an authentication factor with a stored authentication factor.

4. The method of claim 3, wherein the authentication factor is a possession object of the user, wherein the possession object is an object configured to identify the user.

5. The method of claim 3, wherein the authentication factor is a biometric authentication data, wherein authenticating the user further comprises matching the biometric authentication data with a biometric authentication reference template associated with the user.

6. The method of claim 3, wherein the authentication factor comprises a resource identifier associated with a physical object used to capture the at least one biometric enrollment sample.

7. The method of claim 1, wherein the encryption key and the decryption key are generated using the stored user secret as an input to a password authenticated key exchange protocol.

8. The method of claim 1, wherein the encryption key is generated using a commutative encryption algorithm.

9. The method of claim 1, wherein the encryption key is a symmetric encryption key generated using a Diffie-Hellman key exchange algorithm.

10. The method of claim 1, further comprising:
transmitting, to a remote computing system, a template generation request, the template generation request including the user identifier and the at least one biometric enrollment sample; and
receiving, from the remote computing system, the biometric reference template identifier.

11. The method of claim 1, wherein the encrypted biometric enrollment data further comprises user information, wherein the biometric reference template is associated with the user information, wherein the user information is provided to a requesting party upon successful authentication of a biometric authentication sample and the user identifier.

12. The method of claim 1, wherein the storing of the generation of the at least one of the biometric reference template or the enrollment confirmation message further comprises tokenizing the generation of the at least one of the biometric reference template or the enrollment confirmation message.

13. A system comprising one or more processors and a memory comprising non-transitory machine-readable media storing instructions such that, when executed, causes the one or more processors to:

receive encrypted authentication data and a user identifier of a user, the encrypted authentication data comprising at least one authentication sample extracted from a biometric sensor associated with a physical address, the at least one biometric enrollment sample encrypted using an encryption key;

match the user identifier with a stored user secret;

derive a decryption key based on the stored user secret associated with the user identifier;

decrypt the encrypted authentication data using the decryption key to retrieve a stored physical address;

in response to the physical address matching the stored physical address, generate a biometric reference template identifier uniquely identifying a biometric reference template associated with the at least one authentication sample, and a uniform resource locator associated with a biometric service provider that subsequently authenticates the user;

encrypt, using the encryption key, an enrollment confirmation message associated with the user identifier and comprising the biometric reference template identifier and the uniform resource locator;

store, on a repository, a generation of at least one of the biometric reference template or the enrollment confirmation message; and transmit the encrypted enrollment confirmation message to the user to allow the user to be authenticated with third party entities that trusts the computing system.

14. The system of claim 13, wherein:

the encrypted authentication data further comprises a user information request, the user information request associated with the biometric reference template; and the one or more processors are further configured to:
retrieve user information associated with the user information request; and
transmit the user information to a relying party.

15. The system of claim 13, wherein the one or more processors are further configured to authenticate an authentication factor by comparing the authentication factor to a stored authentication factor.

16. The system of claim 13, wherein the encryption key and the decryption key are generated using the stored user secret as an input to a password authenticated key exchange protocol.

17. The system of claim 13, wherein the encryption key is generated using a commutative encryption key exchange algorithm.

18. The system of claim 13, wherein the one or more processors are further configured to:

transmit, to a remote computing system, a match request, the match request including the biometric reference template identifier and the at least one authentication sample;

and receiving, from the remote computing system, a match result, the match result indicative of verification of the at least one authentication sample and the biometric reference template associated with the biometric reference template identifier.

19. A non-transitory computer readable medium having computer-executable instructions embodied therein that, when executed by a computing system, causes the computing system to perform operations comprising:

receiving encrypted biometric enrollment data and a user identifier of a user, the encrypted biometric enrollment data comprising at least one biometric enrollment sample extracted from a biometric sensor associated with a physical address, the at least one biometric enrollment sample encrypted using an encryption key;

matching the user identifier with a stored user secret;

deriving a decryption key based on the stored user secret associated with the user identifier;

decrypting the encrypted biometric enrollment data using the decryption key to retrieve a stored physical address;

in response to the physical address matching the stored physical address, generating a biometric reference template identifier uniquely identifying a biometric reference template associated with the at least one biometric enrollment sample, and a uniform resource locator associated with a biometric service provider that subsequently authenticates the user;

encrypting, using the encryption key, an enrollment confirmation message associated with the user identifier and comprising the biometric reference template identifier and the uniform resource locator;

storing, on a repository, a generation of at least one of the biometric reference template or the enrollment confirmation message; and transmitting the encrypted enrollment confirmation message to the user to allow the user to be authenticated with third party entities that trusts the computing system.

20. The non-transitory computer readable medium of claim 19, the operations further comprising establishing an account for a user including the user identifier and the stored user secret, wherein the establishing the account for the user comprises verifying an identity of the user.

\* \* \* \* \*